US010028513B2

(12) United States Patent
Bartlett

(10) Patent No.: US 10,028,513 B2
(45) Date of Patent: Jul. 24, 2018

(54) SYSTEM, DEVICE, AND METHOD FOR MOISTURE AND TEXTURE DETECTION AND CONTROL IN TORTILLA CHIP PRODUCTION

(71) Applicant: Brian E. Bartlett, Austin, TX (US)

(72) Inventor: Brian E. Bartlett, Austin, TX (US)

( * ) Notice: Subject to any disclaimer, the term of this patent is extended or adjusted under 35 U.S.C. 154(b) by 111 days.

(21) Appl. No.: 15/058,640

(22) Filed: Mar. 2, 2016

(65) Prior Publication Data

US 2017/0251679 A1   Sep. 7, 2017

(51) Int. Cl.
*A21B 5/00* (2006.01)
*A21B 5/02* (2006.01)
*A21D 8/06* (2006.01)
*A21D 13/00* (2017.01)
*A21C 14/00* (2006.01)

(52) U.S. Cl.
CPC ............... *A21D 8/06* (2013.01); *A21C 14/00* (2013.01); *A21D 13/0074* (2013.01)

(58) Field of Classification Search
CPC . A47J 37/00–37/015; A21B 5/00–5/02; A21B 5/04–5/085; A21B 1/00–1/48
USPC ............ 99/326–328, 385–386, 443 R–443 C
See application file for complete search history.

(56) References Cited

U.S. PATENT DOCUMENTS

| 4,513,018 | A | 4/1985 | Rubio |
| 4,978,548 | A | 12/1990 | Cope et al. |
| 5,155,558 | A | 10/1992 | Tannenbaum et al. |
| 5,298,274 | A | 3/1994 | Khalsa |
| 5,399,367 | A | 3/1995 | Mattson |
| 5,400,704 | A | 3/1995 | Huston |
| 5,539,213 | A | 7/1996 | Meeks et al. |
| 5,554,405 | A | 9/1996 | Fazzolare et al. |
| 5,652,010 | A | 7/1997 | Gimmler et al. |
| 5,918,533 | A | 7/1999 | Lawrence et al. |
| 6,001,409 | A | 12/1999 | Gimmler et al. |
| 6,491,959 | B1 | 12/2002 | Chiang et al. |
| 6,572,910 | B2 | 6/2003 | Lanner et al. |
| 6,830,767 | B2 | 12/2004 | Teras et al. |
| 2003/0068418 | A1* | 4/2003 | Bell .......................... A21B 1/48 426/523 |
| 2006/0024407 | A1* | 2/2006 | Rubio .................... A21D 8/042 426/52 |

(Continued)

*Primary Examiner* — Michael Laflame, Jr.
(74) *Attorney, Agent, or Firm* — Olav M. Underdal; IDP Patent Services

(57) ABSTRACT

A production system for moisture and texture detection and control in tortilla and tortilla chip production includes a production line, including a cooker/grinder, a sheeter/cutter, an oven, an equalizer, a fryer, and a cooler/packaging machine; and a production control unit, including a processor, non-transitory memory, an input/output component, a moisture controller, a temperature controller, a belt speed controller, a masa moisture sensor, a chip moisture sensor, laser sensors for measuring surface texture of baked and fried chips, a laser controller, a texture classifier, a feedback controller. Also disclosed is a method for production control, including controlling moisture content, measuring masa moisture, controlling oven, measuring baked surfaces, measuring fried surfaces, classifying baked surfaces, classifying fried surfaces, optimizing oven temperature, optimizing oven belt speed, storing and characterizing historical records.

16 Claims, 4 Drawing Sheets

(56) References Cited

U.S. PATENT DOCUMENTS

| 2007/0137633 | A1* | 6/2007 | McFadden | A21B 1/245 |
| | | | | 126/21 A |
| 2012/0192721 | A1 | 8/2012 | Gonzalez | |
| 2017/0086479 | A1* | 3/2017 | Bai | A23L 1/025 |
| 2017/0089869 | A1* | 3/2017 | Bai | G01N 29/4445 |
| 2017/0290345 | A1* | 10/2017 | Garden | A21C 9/04 |

* cited by examiner

Tortilla/Tortilla Chip Production system

Oven

SYSTEM, DEVICE, AND METHOD FOR MOISTURE AND TEXTURE DETECTION AND CONTROL IN TORTILLA CHIP PRODUCTION

CROSS-REFERENCE TO RELATED APPLICATIONS

N/A

FIELD OF THE INVENTION

The present invention relates generally to the field of tortilla production, and more particularly to methods and systems for controlling moisture and texture during baking of tortillas, tortilla chips, and other food products.

BACKGROUND OF THE INVENTION

A variety of standardized designs have been developed for production lines used in industrial food production of tortillas and tortilla chips. Well known methods are used to measure and control moisture content of masa used for forming chips, but there are generally no methods for measuring moisture in later stages of production, after baking and frying of tortilla chips, and there are no methods for measuring and controlling surface texture of the finished product.

Thus, despite development in design of production lines, it remains very difficult to control the moisture and texture of finished tortilla and tortilla chip products.

As such, considering the foregoing, it may be appreciated that there continues to be a need for novel and improved devices and methods for controlling moisture and texture during baking and frying of tortillas and tortilla chips, and other food products.

SUMMARY OF THE INVENTION

The foregoing needs are met, to a great extent, by the present invention, wherein in aspects of this invention, enhancements are provided to the existing models for controlling texture and moisture in tortilla and tortilla chip production.

In an aspect, a production system for moisture and texture detection and control in tortilla chip production, can include:
a) a production line, including an oven, which is configured to receive pieces of masa from a sheeter/cutter, via a sheeter conveyer, such that the pieces pass through the oven on an internal conveyer, such that the pieces are baked when passing through the oven; and
b) a production control unit, which is configured to control components of the production line, such that the production control unit includes:
a chip moisture sensor, which is configured to measure a moisture content of the baked pieces that are emitted from the oven; and
a laser sensor, which is configured to measure a surface height of the fried pieces that are emitted from the fryer, such that the laser sensor obtains a continuous sequence of height measurements at a predetermined measuring rate.

In a related aspect,
a) the production line can further include an equalizer, which is configured to receive the baked pieces from the oven, via an oven conveyer, such that the equalizer is configured to cool the baked pieces; and a fryer, which is configured to receive the baked pieces from the equalizer, via an equalizer conveyer, such that the fryer is configured to fry the cooled baked pieces; and
b) the production control unit can further include: a laser sensor, which is configured to measure a surface height of the fried pieces that are emitted from the fryer, such that the laser sensor obtains a continuous sequence of height measurements at a predetermined measuring rate.

In a related aspect, the production control unit can further include:
a) a processor;
b) a non-transitory memory;
c) an input/output component;
d) a moisture controller, which is configured to control moisture content of masa in the cooker/grinder by adjusting a proportion of water in the mixture of raw corn, water, and food-grade lime that is processed by the cooker/grinder;
e) a temperature controller, which is configured to communicate with the oven to control a temperature profile of the oven; and
f) a belt speed controller, which is configured to control a speed of the internal conveyer, which can include a plurality of oven level conveyers, such that a transit time of pieces that are passing through the oven; all connected via
g) a data bus.

In a related aspect, the production system can further include a masa moisture sensor, which is configured to measure a moisture content of masa on the cooker conveyer; wherein the masa moisture sensor is a reflection absorption moisture sensor.

In a related aspect, the production system can further include a chip moisture sensor, which is configured to moisture content of the baked pieces that are emitted from the oven.

In a related aspect, the production system can further include a laser sensor, which is configured to measure a surface height of the fried pieces that are emitted from the fryer on a fryer conveyer, such that the laser sensor obtains a continuous sequence of height measurements at a predetermined measuring rate; and a laser controller, which is configured to control the laser sensor, and can disable and enable the laser sensor.

In a related aspect, the production system can further include a texture classifier, which can be configured to analyze the continuous sequence of height measurements from the laser sensor in order to calculate a texture classification of surfaces of the fried pieces that are emitted from the fryer on a fryer conveyer.

In a related aspect, the chip moisture sensor can be a time-domain reflectometry moisture sensor, which is configured to analyze propagation of electromagnetic radiation to determine relative permittivity.

In related aspects, additional chip moisture sensors can be positioned in other locations in the production line.

In a related aspect, the texture classifier can be configured to calculate a fast Fourier transform on the continuous sequence of height measurements in order to calculate a discrete Fourier transform thereby obtaining a frequency domain representation of the continuous sequence, which is correlated to a probability density function for the distribution of blisters, which characterizes the rate of occurrence of different sizes of blisters, such that a frequency in the frequency domain representation corresponds to: a wavelength, which corresponds to a blister diameter, wherein the frequency is correlated to a speed of a fryer conveyer, and an amplitude, which measures the probability of occurrence.

In a related aspect, the texture classifier can be configured to calculate a deviation density function as the calculated probability density function minus a target density function, such that the texture classifier is configured to classify a product related to the continuous sequence as specification compliant, if the maximum value of the deviation density function across the frequency domain is less than a predetermined acceptable deviation.

In a related aspect, the production control unit can further include a feedback controller, which can be configured to execute a first control loop feedback calculation to optimize the temperature of the oven to reach a predetermined moisture target for moisture between the oven and the fryer.

In a related aspect, the first control loop feedback algorithm can be a proportional-integral-derivative controller algorithm.

In a related aspect, the feedback controller can be further configured to execute a second control loop feedback calculation to optimize the belt speed of the oven to reach a predetermined moisture target for moisture between the oven and the fryer.

In a related aspect, the feedback controller can be configured to execute the first and second control loop feedback calculations in parallel.

In a related aspect, the feedback controller is configured to store historical records for chip production, including:
  a) a production result domain, comprising: surface characteristics of chips emitted from the equalizer; and surface characteristic of chips emitted from the fryer; and
  b) a production parameter domain, including measurements of masa moisture; oven temperature; oven transit time; equalizer temperature; equalizer transit time; chip moisture; frying temperature; and frying time.

In a related aspect, the feedback controller can be configured to calculate a characteristic production function from the production parameter domain to the production result domain, by executing a function fitting algorithm to fit the characteristic production function to the historical records for chip production.

In a related aspect, the function fitting algorithm can be an artificial neural network that is trained on the historical records.

In a related aspect, a method for tortilla and tortilla chip production control, can include some or all of:
  a) Controlling moisture content of masa before pieces of the masa enters an oven of a production line;
  b) Measuring masa moisture, wherein a production control unit can communicate with a masa moisture sensor to measure a moisture content of masa on the cooker conveyer;
  c) Controlling oven, wherein a transit time and a temperature of the oven can be adjusted to control baking of the pieces;
  d) Measuring chip moisture, wherein the production control unit can communicate with a chip moisture sensor to measure a moisture content of baked pieces that are emitted from the oven;
  e) Measuring baked surfaces, wherein a surface height of baked pieces that are emitted from the oven can be measured with a laser sensor, such that the laser sensor obtains a continuous sequence of height measurements;
  f) Measuring fried surfaces, wherein a surface height of fried pieces that are emitted from the fryer can be measured with a laser sensor, such that the laser sensor obtains a continuous sequence of height measurements;
  g) Classifying baked surfaces, wherein a production control unit can calculate a first texture classification of surfaces of the baked pieces that are emitted from the oven;
  h) Classifying fried surfaces, wherein a production control unit can calculate a second texture classification of surfaces of the fried pieces that are emitted from the fryer;
  i) Optimizing oven temperature, wherein the production control unit can execute a first control loop feedback calculation to optimize the temperature of the oven to reach a predetermined moisture target for moisture of the baked pieces that are emitted from the oven.
  j) Optimizing oven belt speed, wherein the production control unit can execute a second control loop feedback calculation to optimize the belt speed of the oven to reach a predetermined moisture target for moisture of the baked pieces that are emitted from the oven;
  k) Storing historical records, wherein the feedback controller can store historical records for chip production, including:
    A production result domain, including surface characteristics of chips emitted from the equalizer; and surface characteristics of chips emitted from the fryer;
    A production parameter domain, including measurement of masa moisture; oven temperature; oven transit time; equalizer temperature; equalizer transit time; chip moisture; frying temperature; and frying time.
  l) Characterizing historical records, wherein the feedback controller can calculate a characteristic production function from the production parameter domain to the production result domain, by fitting or matching a non-linear or linear function to the historical records for chip production, using well-known methods for function fitting of multi-dimensional data samples.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
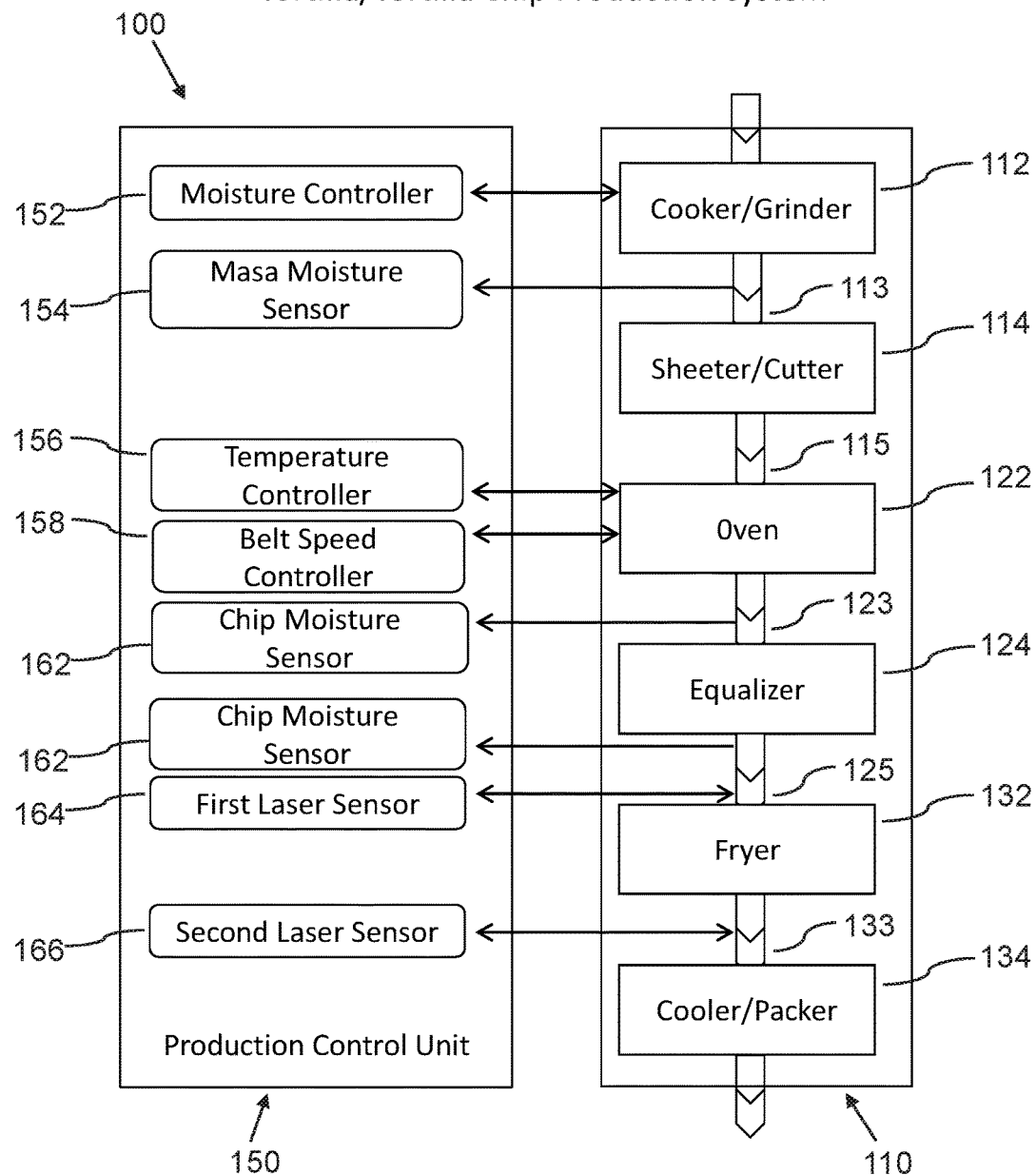
FIG. 1 is a schematic diagram illustrating a tortilla production system, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a production system 100 with reference to FIG. 1, in such manner that like reference numerals refer to like components throughout; a convention that we shall employ for the remainder of this specification.

In an embodiment, a production system 100 for moisture and texture detection and control in tortilla and tortilla chip production can include at least one, a subset of, or all of:

a) a production line, including:
  i. a cooker/grinder 112; which is configured to
    1. receive a mixture of raw corn, water, and food-grade lime, in the form of calcium oxide (quicklime) or calcium hydroxide (hydrated lime);
    2. cook the mixture, and optionally quench the cooked mixture;
    3. grind the mixture, thereby creating corn masa, a traditional corn dough used for tortilla production;
    4. optionally, quench the masa, wherein the cooker/grinder is configured to rapidly cool the masa down to about 68-72 degrees Celsius;
  In related embodiment, the cooker/grinder 112 can include a subsystem of corn holding hopper, a kettle for cooking, soak tanks for soaking the cooked corn, a corn washer, a mill/grinder, and a masa pump, all connected via pipes and/or other conveyers;
  ii. A sheeter/cutter 114, which is configured to:
    1. receive the masa from the cooker/grinder 112, via a cooker conveyer 113, which can be a pipe conveyer 113;
    2. form a sheet of the masa, which is kneaded, extruded and fed through sheeter rolls, to form a sheet;
    3. cutting pieces from the sheet of masa, such that the pieces are configured to be used for tortilla chips or tortillas, and can be cut in at least one predetermined shape;
  iii. An oven 122, which is configured to receive the pieces from the sheeter/cutter 114 via a sheeter conveyer 115, such that the pieces pass through the oven 122 on an internal conveyer, such that the pieces are baked when passing through the oven 122. The oven 122 can be gas fired, and the internal own conveyer can be arranged in multiple sections, tiers, or levels, which for example can include three oven levels arranged at different heights in the oven 122;
  iv. An equalizer 124, which can also be called a proofer or cooler, which is configured to receive the baked pieces from the oven 122 via an oven conveyer 123, such that the equalizer 124 is configured to cool the baked pieces;
  v. A fryer 132, which is configured to receive the baked pieces from the equalizer 124, via an equalizer conveyer 125, such that the fryer 132 is configured to fry the cooled baked pieces;
  vi. A cooler/packaging machine 134, which is configured to receive the fried pieces from the fryer 132, via a fryer conveyer 133, such that the cooler/packaging machine 134 is configured to cool and pack the fried pieces;
b) A production control unit 150, which can be configured to control components of the production line 110; and can further include:
  a. A masa moisture sensor 154, which is configured to measure a moisture content of the corn masa that is emitted from the cooker grinder 112;
  b. A chip moisture sensor 162, which is configured to measure a moisture content of the baked pieces that are emitted from the oven 122;
  c. A laser sensor 166, which is configured to measure a surface height of the fried pieces that are emitted from the fryer 132, such that the laser sensor 166 obtains a continuous sequence of height measurements at a measuring rate of up to 20 kHz or higher;

In related embodiments, the additional chip moisture sensors 162 can be positioned in other locations of the production line to measure moisture content of chips in production, such that moisture can be measured after baking in the oven 122, after cooling in the equalizer 124; after frying in the fryer 132; and/or after cooling and before packing in the cooler/packaging machine 134. The cooler/packaging machine 134 may be configured as a cooler component and a packaging machine, which are connected by a cooler conveyer, such that a chip moisture sensor 162 can be positioned to measure cooled chips on the cooler conveyer before packaging.

In conventional tortilla and tortilla chip production lines, moisture control is performed at the masa stage, prior to baking and frying, using conventional reflection absorption moisture sensor technology. However, such sensors are not well suited for use on baked food products, and are therefore not used in stages after baking. Due to absence of available methods for accurate moisture detection, tortilla and tortilla chip production lines are therefore reliant on pre-baking moisture on-line analysis or lab based off-line analysis.

In a related embodiment, the production control unit 150 can be configured to execute a control loop feedback algorithm to stabilize a moisture reading from the chip moisture sensor 154 to reach a moisture set point, based on adjustment of the oven temperature, the oven belt speed, or both. The control loop feedback algorithm can for example be a conventional PID control algorithm.

In a related embodiment, a laser sensor 164 can be mounted in a static position and configured to take continuous measurements of objects passing by in a static point of the equalizer conveyer 125.

In a related embodiment, a laser sensor 166 can be mounted in a static position and configured to take continuous measurements of objects passing by in a static point of the fryer conveyer 133. Alternatively, or additionally, in further related embodiments, a laser sensor 166 can be mounted in a static position and configured to take continuous measurements of objects passing by in a static point of the oven conveyer 123, and/or a cooler conveyer, after cooling in the cooler/packaging machine 134.

Figure 4:
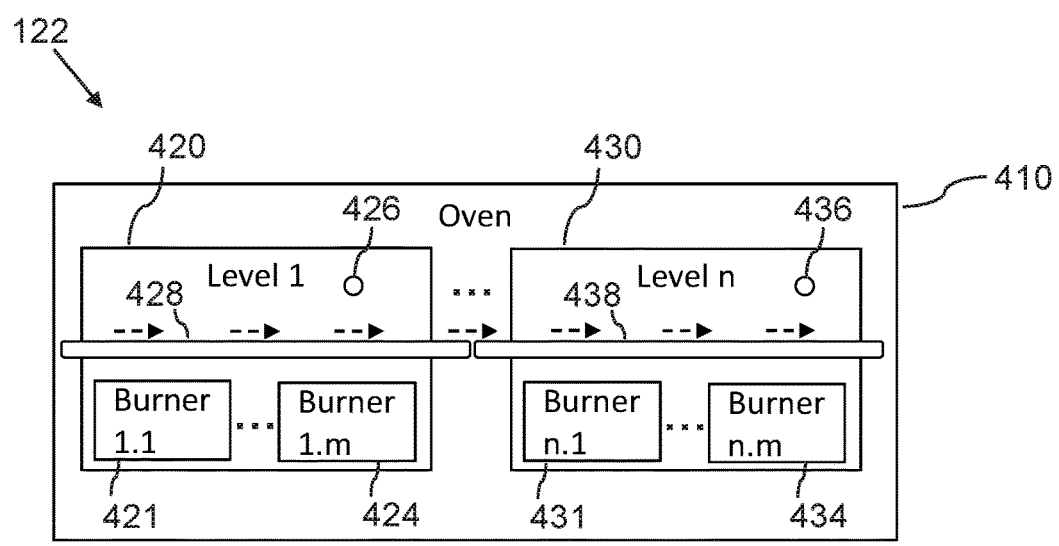
FIG. 4 is a schematic diagram illustrating an oven of a tortilla production system, according to an embodiment of the invention.

In a related embodiment, as shown in FIG. 4, an oven 122 can include:
a) a plurality of n oven levels 420 430, each including
 i. an oven belt 428 438, which is configured to transport pieces that are positioned on the oven belt 428 438;
 ii. a plurality of m gas burners 421 424 431 434, which are configured to bake the pieces that are transported on the oven belt 428 438; and
 iii. at least one temperature sensor 426 436.

Figure 2:
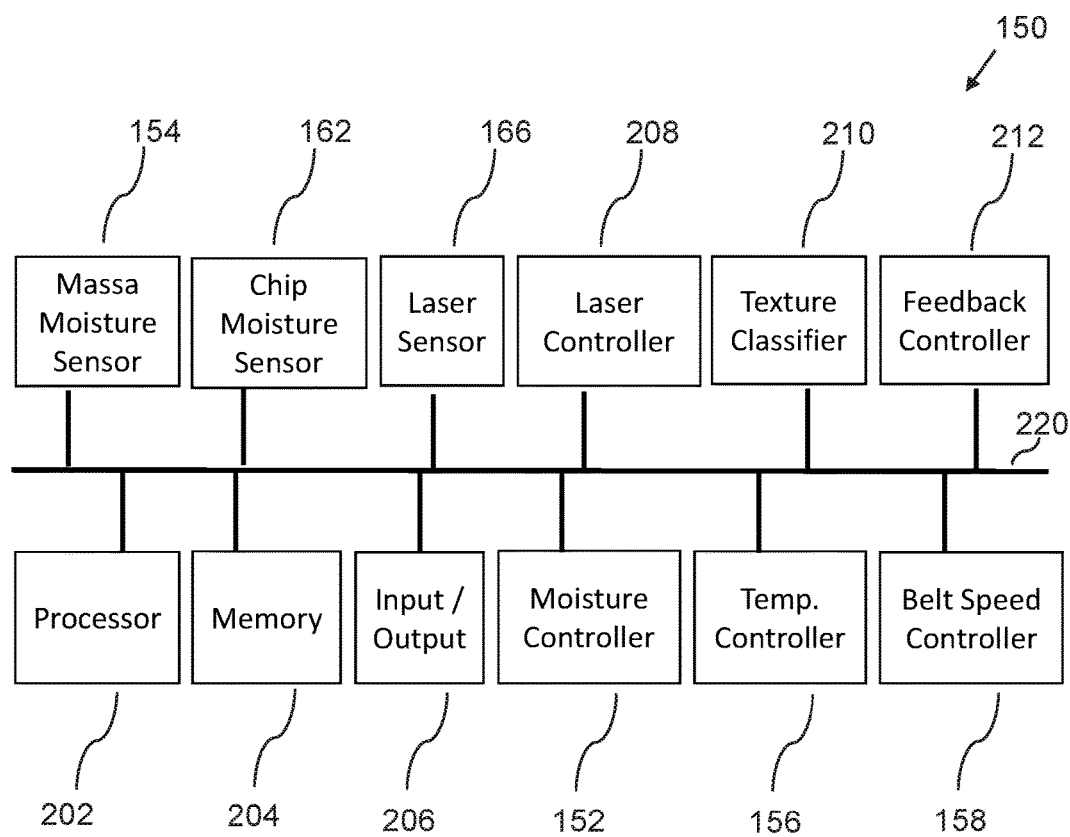
FIG. 2 is a schematic diagram illustrating a production control unit, according to an embodiment of the invention.

In a related embodiment, as shown in FIG. 2, a production control unit 150 can include:
b) A processor 202;
c) A non-transitory memory 204;
d) An input/output component 206;
e) A masa moisture sensor 154, which can be configured to measure a moisture content of masa on the cooker conveyer 113;
f) A chip moisture sensor 162, which can be configured to measure moisture content of the baked pieces that are emitted from the oven 122;
g) A laser sensor 166, which can be configured to measure a surface height of the fried pieces that are emitted from the fryer 132, such that the laser sensor 166 obtains a continuous sequence of height measurements at a measuring rate of up to 20 kHz or higher;
h) A laser controller 208, which can be configured to control the laser sensor 166, and can disable and enable the laser sensor 166;
i) A texture classifier 210, which can be configured to analyze the continuous sequence of height measurements from the laser sensor 166 in order to calculate a texture classification of surfaces of the fried pieces that are emitted from the fryer 132;
j) A moisture controller 152, which can be configured to control moisture content of masa in the cooker/grinder 112 by adjusting a proportion of water in the mixture of raw corn, water, and food-grade lime that is processed by the cooker/grinder 112;
k) A temperature controller 156, which can be configured to communicate with the oven 122 to control a temperature profile of the oven 122, for example by adjusting a gas supply to burners in the oven or by adjusting electric power to electric heating elements; and
l) A belt speed controller 158, which can be configured to control a speed of the internal conveyer, which can include a plurality of oven level conveyers, such that a transit time of pieces that are passing through the oven 122 can be adjusted; all connected via
m) A data bus 220.

In a further related embodiment, the temperature controller 156 can be configured to control temperatures for each level in the oven 122, or for individual groupings of burners in the oven 122, such that control of various temperatures and speeds of various belts determines the temperature profile, wherein the temperature profile is defined as the temperature history of components of the oven 122, including levels or compartments.

In a further related embodiment, the belt speed controller 158, can be configured to control individual belt speeds for belts in each level or stage in the oven 122.

In a related embodiment, the masa moisture sensor 154 can be a reflection absorption moisture sensor, such as for example an IR-3000 NIR Moisture Gauge manufactured by Sensortech Systems, Inc.

In a related embodiment, the chip moisture sensor 162 can be a time-domain reflectometry moisture sensor, which analyzes propagation of radar waves (i.e. electromagnetic radiation) to determine relative permittivity (i.e. dielectric constant) and thereby determine moisture content. The chip moisture sensor 162 can for example be a Sono-Vario moisture probe manufactured by IMKO Micromodultechnik GmbH.

In a related embodiment, the texture classifier 210, can be configured to calculate a Fast Fourier Transform on the continuous sequence of height measurements in order to calculate a discrete Fourier transform thereby obtaining a frequency domain representation of the continuous sequence, which is correlated to a probability density function for the distribution of blisters, which characterizes the rate of occurrence of different sizes of blisters, such that a frequency in the frequency domain representation corresponds to:
a) a wavelength, which corresponds to a blister diameter, wherein the frequency is correlated to the speed of the fryer conveyer 133, and
b) an amplitude, which measures the probability of occurrence.

In a further related embodiment, the texture classifier 210, can be configured to remove/filter out irrelevant parts of the continuous sequence, prior to calculating the Fast Fourier Transform, which can include removing:
a) Low frequency signals, which correspond to a conveyer 123 125 133 surface, such that signals below a predetermined low-frequency threshold are removed. The low-frequency threshold can be a calibrated value; and
b) High frequency signals, which can correspond to a chip edge, or can be associated with other artifacts not related to a chip surface, such that signals above a predetermined high-frequency threshold are removed. The high-frequency threshold can be a calibrated value;
whereby the remaining signal is strongly correlated with surfaces of chips that are transported on the conveyer 123 125 133.

In a further related embodiment, the texture classifier 210, can be configured to calculate a deviation density function as the calculated probability density function minus a target density function, such that the texture classifier is configured to classify products related to the continuous sequence as "on spec" if the maximum value of the deviation density function across the frequency domain is less than a predetermined acceptable deviation. A specific target density function can be associated with different types of products and be part of the production recipe in a supervisory control system for the specific product.

In an alternative related embodiment, the texture classifier 210, can be configured to perform a circular curve fitting regression on the continuous sequence of height measurements, for example by a circular least square curve fitting method, or other well-known circle curve fitting methods, in order to characterize and count blisters according to a size distribution. A potential blister would be located using a change in positive to negative derivative of the position data, to locate edges, and a circular regression analysis would be run for data points in that area. If a circle is detected at a correlation factor higher than some selected threshold, then the instance of the circle would be recorded against a histogram or bin type distribution. A similar algorithm could be executed for fitting ellipse shaped blisters, using similar methods for curve fitting of ellipses, to also match a ration of long axis to short axis.

In a related embodiment, the texture classifier 210 can be implemented with a high-speed signal processor, which can be FPGA based, or it can be implemented as a combination of software and a high speed signal processor, or purely in software.

In a further related embodiment, the high-speed signal processor of the texture classifier 210 can be configured to filter out significant noise from variation in thickness, movement and vibration of the conveyor, etc.

In another related embodiment, the production control unit 150 can further include:
a) a feedback controller 212, which can be configured to execute a first control loop feedback calculation to optimize the temperature profile of the oven 122 to reach a predetermined moisture target for moisture content of the baked pieces that are emitted from the oven 122, wherein the temperature profile includes a temperature for each level 420 430 of the oven 122, wherein each temperature can be optimized by a separate control loop feedback calculation.

In a further related embodiment, the first control loop feedback algorithm of the feedback controller can be a proportional-integral-derivative controller algorithm, such that:

$$u_{temp}(t) = K_p e_{temp}(t) + K_i \int e_{temp}(t)dt + K_d \frac{d}{dt}[e_{temp}(t)]$$

where
$u_{temp}(t)$ is a control variable for control of the temperature of the oven;
$e_{temp}(t)$ is an error term for the current moisture as compared to a moisture set point, i.e. $e_{temp}(t)$=SP(t)−PV(t);
$K_p$, $K_i$, and $K_d$ are tuning coefficients for respectively the proportional, integral, and derivative terms.

In a further related embodiment, temperature of the oven 122 can be controlled using systems, devices and methods disclosed in U.S. Non-Provisional patent application Ser. No. 14/964,193, filed Dec. 9, 2015, titled "System, device, and method for oven temperature control in tortilla and tortilla chip production", which is incorporated herein by reference in its entirety, under 37 CFR § 1.57. The relationship between moisture and temperature is highly non-linear and dependent on initial moisture, variable masa properties, and transit time. A traditional proportional-integral-derivative controller algorithm is therefore only fully effective for use in the cooker/grinder 112 stage.

In yet a related embodiment, the feedback controller 212, can further be configured to execute a second control loop feedback calculation to optimize a belt speed profile of the oven to reach a predetermined moisture target for moisture content of the baked pieces that are emitted from the oven 122, wherein the belt speed profile includes a belt speed for a belt 428 438 in each level 420 430 of the oven 122, wherein each belt speed can be optimized by a separate control loop feedback calculation.

In further related embodiments, the feedback controller 212 can be configured to execute the first and second control loop feedback calculations independently/separately, in sequence, and/or in parallel. In this relation, for a specific masa recipe, production of an optimal and consistent tortilla chip may include stabilizing to predetermined set points for masa moisture and oven temperature.

In related embodiments, a plurality of combinations of temperature and belt speed profiles may produce the desired moisture as measured across the entire chip, such that an optimum distribution of moisture through the chip produces the desired texture with the appropriate overall moisture content to ensure stable shelf life of the resulting product.

In a further related embodiment, the feedback controller 212 can be configured to store historical records for chip production, including:
a) A production result domain, including:
   i. the surface characteristics of chips emitted from the equalizer 124;
   ii. surface characteristic of chips emitted from the fryer 132;
b) A production parameter domain, including measurement of
   iii. masa moisture;
   iv. oven temperature for each level 420 430 of the oven 122;
   v. oven transit time for each level 420 430 of the oven 122;
   vi. equalizer temperature;
   vii. equalizer transit time;
   viii. chip moisture;
   ix. fryer inlet temperature;
   x. fryer outlet temperature;
   xi. fryer oil flow; and
   xii. frying time.

In a yet further related embodiment, the feedback controller can be configured to calculate a characteristic production function from the production parameter domain to the production result domain, by fitting or matching a non-linear or linear function to the historical records for chip production, using well-known methods for function fitting of multi-dimensional data samples. Such function fitting can for example be calculated by using a plurality of well-known methods from the areas of machine learning, function approximation, and curve fitting, including:
a) Calculating the characteristic production function by configuring the characteristic production function as an artificial neural network, and training the artificial neural network on the historical records;
b) Calculating the characteristic production function by least-square function approximation to match historical records.

Figure 3:
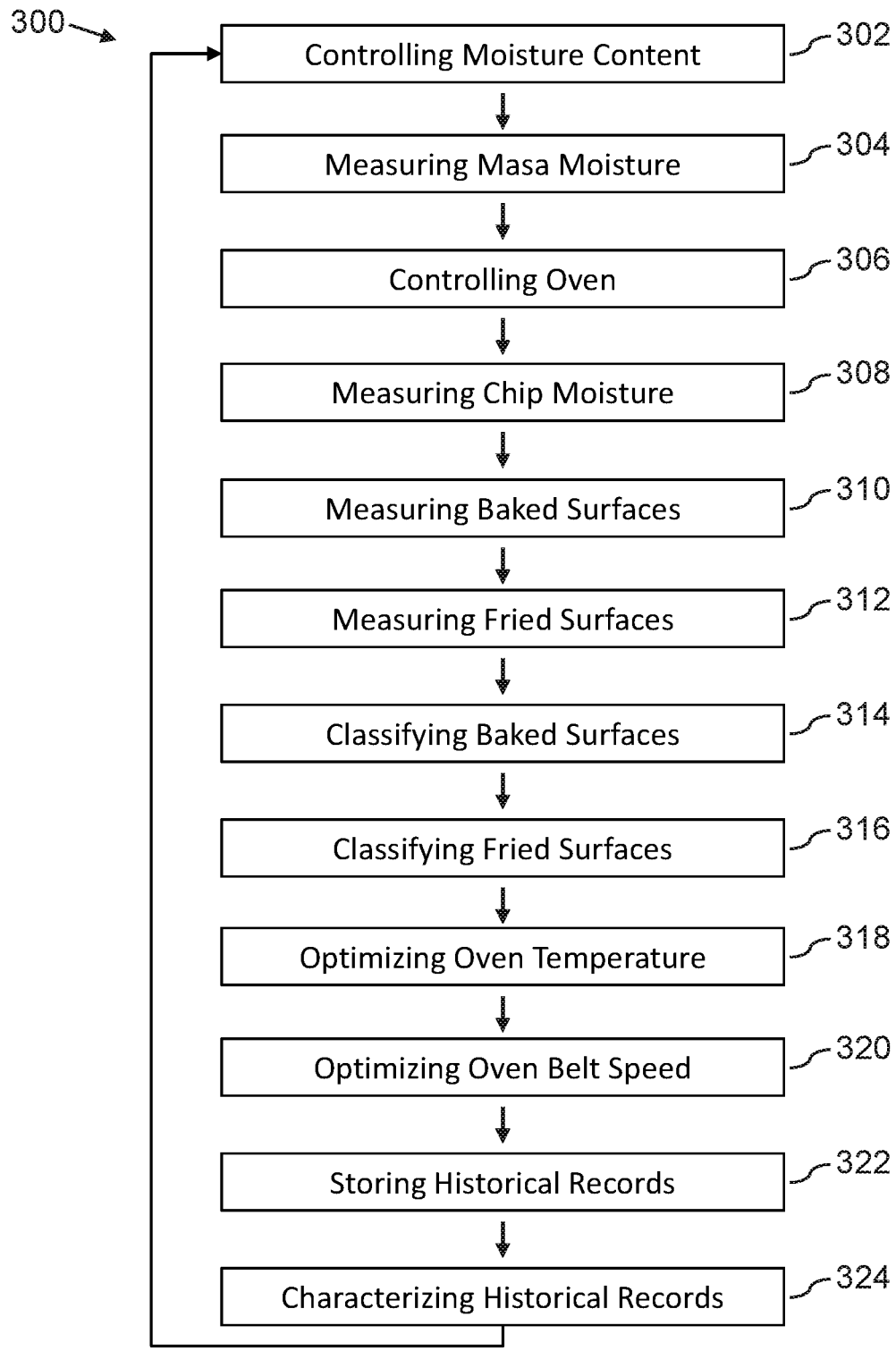
FIG. 3 is a flowchart illustrating steps that may be followed, in accordance with one embodiment of a method or process of tortilla production control.

In an embodiment, as illustrated in FIG. 3, a method for tortilla and tortilla chip production control 300, can include at least one, a subset, or all of:
a) Controlling moisture content 302, wherein moisture content of masa is adjusted before pieces of the masa enters an oven 122 of a production line 110, which can be done during a grinding process in the cooker/grinder 112;
b) Measuring masa moisture 304, wherein a production control unit 150 communicates with a masa moisture sensor 154, to measure a moisture content of masa on the cooker conveyor 113;

c) Controlling oven 306, wherein a transit time and a temperature of the oven 122 are adjusted to control baking of the pieces;

d) Measuring chip moisture 308, wherein a production control unit 150 communicates with a chip moisture sensor 162 to measure a moisture content of baked pieces that are emitted from the oven 122;

e) Measuring baked surfaces 310, wherein a surface height of baked pieces that are emitted from the oven 122 are measured with a first laser sensor 164, such that the first laser sensor 164 obtains a continuous sequence of height measurements at a measuring rate of up to 20 kHz or higher;

f) Measuring fried surfaces 312, wherein a surface height of fried pieces that are emitted from the fryer 132 are measured with a second laser sensor 166, such that the second laser sensor 166 obtains a continuous sequence of height measurements at a measuring rate of up to 20 kHz or higher;

g) Classifying baked surfaces 314, wherein a production control unit 150 calculates a first texture classification of surfaces of the baked pieces that are emitted from the oven 122;

h) Classifying fried surfaces 316, wherein a production control unit 150 calculates a second texture classification of surfaces of the fried pieces that are emitted from the fryer 132;

i) Optimizing oven temperature 318, wherein the production control unit 150 executes a first control loop feedback calculation to optimize the temperature profile of the oven 122 to reach a predetermined moisture target for moisture of the baked pieces that are emitted from the oven 122.

j) Optimizing oven belt speed 320, wherein the production control unit 150 executes a second control loop feedback calculation to optimize the belt speed profile of the oven 122 to reach a predetermined moisture target for moisture of the baked pieces that are emitted from the oven 122;

k) Storing historical records 322, wherein the feedback controller 212 stores historical records for chip production, including:
  i. A production result domain, including:
    1. surface characteristics of chips emitted from the equalizer 124;
    2. surface characteristics of chips emitted from the fryer 132;
  ii. A production parameter domain, including measurement of:
    1. masa moisture;
    2. oven temperature;
    3. oven transit time;
    4. equalizer temperature;
    5. equalizer transit time;
    6. chip moisture;
    7. frying temperature; and
    8. frying time.

l) Characterizing historical records 324, wherein the feedback controller 212 calculates a characteristic production function from the production parameter domain to the production result domain, by fitting or matching a non-linear or linear function to the historical records for chip production, using well-known methods for function fitting of multi-dimensional data samples.

FIGS. 1, 2, and 3 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 1, 2, and 3 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

It shall be understood that the above-mentioned components of the production control unit 150 are to be interpreted in the most general manner.

For example, the processor 202 can include a single physical microprocessor or microcontroller, a cluster of processors, a datacenter or a cluster of datacenters, a computing cloud service, and the like.

In a further example, the non-transitory memory 204 can include various forms of non-transitory storage media, including random access memory and other forms of dynamic storage, and hard disks, hard disk clusters, cloud storage services, and other forms of long-term storage. Similarly, the input/output 206 can include a plurality of well-known input/output devices, such as screens, keyboards, pointing devices, motion trackers, communication ports, and so forth.

Furthermore, it shall be understood that the production control unit 150 can include a number of other components that are well known in the art of general computer devices, and therefore shall not be further described herein. This can include system access to common functions and hardware, such as for example via operating system layers such as Windows, Linux, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the production control unit 150 can communicate with the production line 110 over a network, which can include the general Internet, a Wide Area Network or a Local Area Network, or another form of communication network, transmitted on wired or wireless connections. Wireless networks can for example include Ethernet, Wi-Fi, Bluetooth, ZigBee, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the production system 100, and devices, components, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A production system for moisture and texture detection and control in tortilla chip production, comprising:
    a) a production line, comprising:
        an oven, which is configured to receive pieces of a masa from a sheeter/cutter, via a sheeter conveyer, such that the pieces pass through the oven on an internal conveyer, such that the pieces are baked when passing through the oven; and
    b) a production control unit, which is configured to control components of the production line, the production control unit comprising:
        a first chip moisture sensor, which is configured to measure a first moisture content of the baked pieces that are emitted from the oven; and
        a first laser sensor, which is configured to measure a surface height of the baked pieces that are emitted from the oven, such that the first laser sensor obtains a first continuous sequence of height measurements at a first predetermined measuring rate.

2. The production system of claim 1, wherein
    a) the production line further comprises:
        an equalizer, which is configured to receive the baked pieces from the oven, via an oven conveyer, such that the equalizer is configured to cool the baked pieces; and
        a fryer, which is configured to receive the baked pieces from the equalizer, via an equalizer conveyer, such that the fryer is configured to fry the cooled baked pieces; and
    b) the production control unit further comprises:
        a second laser sensor, which is configured to measure a surface height of the fried pieces that are emitted from the fryer, such that the second laser sensor obtains a second continuous sequence of height measurements at a second predetermined measuring rate.

3. The production system of claim 2, wherein the production control unit further comprises:
    a) a processor;
    b) a non-transitory memory;
    c) an input/output component;
    d) a moisture controller, which is configured to control moisture content of the masa that is produced by a cooker/grinder by adjusting a proportion of water in a mixture of raw corn, water, and food-grade lime that is processed by the cooker/grinder;
    e) a temperature controller, which is configured to communicate with the oven to control a temperature profile of the oven; and
    f) a belt speed controller, which is configured to control a speed of the internal conveyer, such that a transit time of pieces that are passing through the oven is adjustable; all connected via
    g) a data bus.

4. The production system of claim 3, further comprising:
    a masa moisture sensor, which is configured to measure a moisture content of masa in the cooker conveyer;
    wherein the masa moisture sensor is a reflection absorption moisture sensor.

5. The production system of claim 2, further comprising:
    a second chip moisture sensor, which is configured to measure a second moisture content of the baked pieces that are emitted from the equalizer.

6. The production system of claim 3, further comprising:
a texture classifier, which is configured to analyze the second continuous sequence of height measurements from the second laser sensor in order to calculate a texture classification of surfaces of the fried pieces that are emitted from the fryer on a fryer conveyer.

7. The production system of claim 3, wherein the first chip moisture sensor is a time-domain reflectometry moisture sensor, which is configured to analyze propagation of electromagnetic radiation to determine relative permittivity.

8. The production system of claim 6, wherein the texture classifier is configured to calculate a fast Fourier transform on the second continuous sequence of height measurements in order to calculate a discrete Fourier transform thereby obtaining a frequency domain representation of the second continuous sequence, which is correlated to a probability density function for the distribution of blisters, which characterizes the rate of occurrence of different sizes of blisters, such that a frequency in the frequency domain representation corresponds to:
   a) a wavelength, which corresponds to a blister diameter, wherein the frequency is correlated to a speed of a fryer conveyer, and
   b) an amplitude, which measures the probability of occurrence.

9. The production system of claim 6, wherein the texture classifier is configured to calculate a deviation density function as the calculated probability density function minus a target density function, such that the texture classifier is configured to classify a product related to the second continuous sequence as specification compliant, if the maximum value of the deviation density function across the frequency domain is less than a predetermined acceptable deviation.

10. The production system of claim 3, wherein the production control unit further comprises:
a feedback controller, which is configured to execute a first control loop feedback algorithm to optimize the temperature of the oven to reach a predetermined moisture target for moisture between the oven and the fryer.

11. The production system of claim 10, wherein the first control loop feedback algorithm is a proportional-integral-derivative controller algorithm.

12. The production system of claim 10, wherein the feedback controller is further configured to execute a second control loop feedback algorithm to optimize the belt speed of the oven to reach a predetermined moisture target for moisture between the oven and the fryer.

13. The production system of claim 12, wherein the feedback controller is configured to execute the first and second control loop feedback algorithms in parallel.

14. The production system of claim 10, wherein the feedback controller is configured to store historical records for chip production, comprising:
   a) a production result domain, comprising:
      surface characteristics of chips emitted from the equalizer; and
      surface characteristic of chips emitted from the fryer; and
   b) a production parameter domain, comprising measurements of
      masa moisture;
      oven temperature;
      oven transit time;
      equalizer temperature;
      equalizer transit time;
      chip moisture;
      frying temperature; and
      frying time.

15. The production system of claim 14, wherein the feedback controller is configured to calculate a characteristic production function from the production parameter domain to the production result domain, by executing a function fitting algorithm to fit the characteristic production function to the historical records for chip production.

16. The production system of claim 15, wherein the function fitting algorithm is an artificial neural network that is trained on the historical records.

* * * * *